No. 714,311. Patented Nov. 25, 1902.
G. S. LEE.
UNIVERSAL UNION OR COUPLING.
(Application filed Aug. 10, 1901. Renewed Oct. 20, 1902.)
(No Model.)
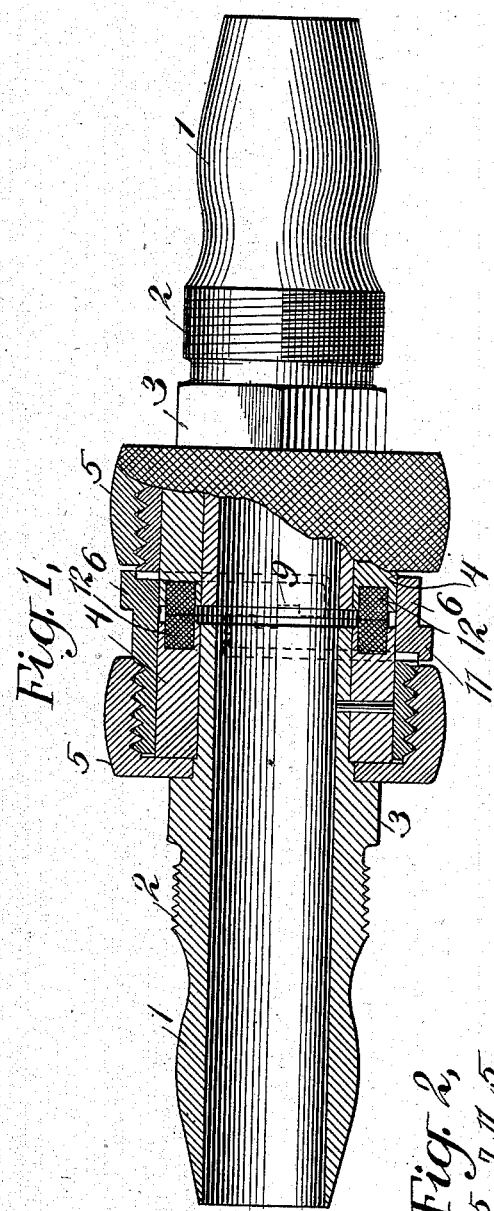
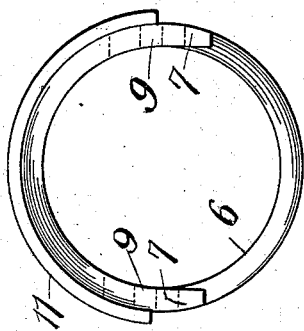
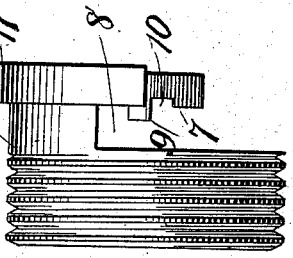
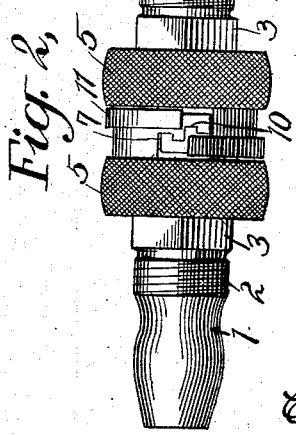
WITNESSES:
INVENTOR
George S. Lee
BY
Chapin & Naymm
His ATTORNEYS

UNITED STATES PATENT OFFICE.

GEORGE S. LEE, OF HAWTHORNE, NEW JERSEY.

UNIVERSAL UNION OR COUPLING.

SPECIFICATION forming part of Letters Patent No. 714,311, dated November 25, 1902.

Application filed August 10, 1901. Renewed October 20, 1902. Serial No. 128,082. (No model.)

*To all whom it may concern:*

Be it known that I, GEORGE S. LEE, a citizen of the United States of America, and a resident of Hawthorne, in the county of Passaic and State of New Jersey, have invented a certain new and useful Universal Union or Coupling, of which the following is a specification, reference being had to the accompanying drawings, forming a part thereof.

My invention relates to improvements in unions or couplings for connecting lengths of hose, pipe, and the like; and it consists in the novel construction of the device, whereby the use of right and left parts or male and female parts or other unlike but complementary parts is avoided, and each complete coupling is adapted to be connected to any other similarly-constructed coupling of the same size without fitting or adjustment and a tight joint between the couplings is insured.

The objects of my invention are to avoid the use of unlike but complementary interlocking members in unions or couplings for hose, pipe, and the like, to avoid the necessity of adjusting any portion of such a coupling in order to adapt it for connection to a corresponding coupling, to render the coupling attachable directly either to hose, pipe, or the like, to insure the making of a tight joint, and generally to render the union or coupling universal in every sense and to make it as simple, compact, durable, and inexpensive as possible.

I will now proceed to describe one form of union or coupling embodying my invention and will then point out the novel features thereof in claims.

In the drawings which accompany and form a part of this specification, Figure 1 is a side view and partial section of two couplings embodying my invention connected together. Fig. 2 is an outside view, on a smaller scale, of two such couplings connected together, the view showing the appearance of two couplings when joined. Fig. 3 is a side view of one of the sectional locking-rings, and Fig. 4 is an end view of such a locking-ring.

According to my invention each coupling consists of an attaching section or member adapted for connection to a hose, pipe, or the like and provided with a single locking member or ring, adapted to interlock with a similar locking member of another coupling and to be separated from such other locking member easily and rapidly, and provided also with means for drawing such two couplings together and producing a tight joint.

In the drawings numerals 1 1 indicate two similar nipples, each adapted to be inserted into the mouth of a piece of flexible hose or the like and to be connected thereto by means of wire wound around the end of the hose in the ordinary manner, but provided also with a screw-threaded shoulder 2, adapted to permit such nipple to be screwed into a screw-threaded orifice of any device to which it may be desired to connect the nipple or into the end of a pipe coupling or adapter, and in proximity to such screw-threaded portion 2 there is on each nipple a hexagonal-shaped portion 3, adapted to permit the use of a nut-wrench in screwing the nipple home. Each such nipple is provided with a retaining-collar 4 on that end which is adapted to project from a hose or the like to which the nipple may be attached and with a flanged and screw-threaded ring 5, mounted loosely on the nipple, but held thereon between the retaining-collar 4 and a shoulder of the nipple. In assembling the parts of the coupling the ring 5 is first placed on the nipple and then the retaining-ring is placed thereon and secured in place by a pin or other suitable means.

6 6 are two exactly similar locking members or rings adapted to fit over the retaining-collars 4 and each provided at one end with screw-threads corresponding to those of the rings 5 and at the other end cut away on one side and provided with locking-tongues 7, adapted to intermesh with and interlock with corresponding tongues of the other ring. In order that the tongues of the two rings may interlock, a slot 8 is provided between each tongue 7 and the body of the ring, the tongues projecting to one side of the plane of separation of the couplings and the slots extending to the opposite side of such plane of separation. Each ring 6 is also provided with a lug 9, projecting into each slot 7, and adjacent to such lug, with a recess 10, adapted to receive a lug 9 of the other ring. When the rings 6 are together and in line, with the tongues 7 of each ring within the slots 8 of the other ring and the lugs 9 of each ring within the recesses 10 of the other ring, the two rings are interlocked against separation either longitudinally or laterally, yet by moving the rings together slightly in a longitudinal direction the lugs 9 are freed from the recesses 10 and the rings may then be separated laterally. Each ring 6 is also provided with a flange 11, adapted to overlap the other ring when the two rings are together, thus centering the rings with respect to each other.

In using this coupling the ends of the two sections of hose, pipe, or the like provided with couplings and which are to be connected together are brought together and the interlocking rings 6 turned (these rings being freely rotatable when not interlocked) until their interlocking portions are opposite each other and the tongues 7 will intermesh. The rings 6 are then brought together and interlocked, and the rings 5 are turned so as to draw each ring 6 back on its nipple, thereby pressing toward each other the ends of these nipples and locking the rings 6 against separation. The retaining-collars 4 may be provided with packing-rings 12, of rubber or similar material, which when pressed together, as above described, will insure a tight joint.

In case of accidental breakage of one of the locking-rings it may be removed and replaced by another by rotation of its screw-threaded collar 5.

It is obvious that the device herein described is capable of many modifications and changes in construction, and I do not limit myself to the particular construction shown and described.

What I claim is—

1. A coupling comprising an attaching member and a locking member laterally separable from a twin locking member of a like coupling, whereby two similar couplings may be connected or disconnected, said locking member being a ring cut away on one side and having laterally-projecting tongues and slots adapted to receive corresponding tongues of a similar ring and means for preventing lateral separation of the rings when interlocked; the coupling having also means for holding its said locking-ring and a similar locking-ring together, when so interlocked.

2. A coupling comprising an attaching member and a locking member laterally separable from a twin locking member of a like coupling, whereby two similar couplings may be connected or disconnected, said locking member being a ring cut away on one side and having laterally-projecting tongues, and slots adapted to receive corresponding tongues of the other ring, and means for preventing lateral separation of the rings when interlocked, and having likewise a flange adapted to overlap the end of the other ring and center the same; the coupling having also means for holding its said locking-ring and a similar locking-ring together, when so interlocked.

3. A coupling comprising an attaching member, a locking member laterally separable from a twin locking member of a like coupling, and a screw-threaded revoluble ring engaging said locking member and adapted to draw it and a similar member with which it may be in engagement, together; said locking member being a ring revolubly mounted on its attaching member and having, as a part of it, locking means adapted to engage with the corresponding locking means of the twin locking-ring of a similar coupling.

4. In a union or coupling, the combination with an attaching member, and a retaining-collar, of a locking-ring on said attaching member having, as a part of it, locking means adapted to engage with the corresponding locking means of the twin locking-ring of another coupling, and a screw-threaded ring mounted on said attaching member, retained thereon by said retaining-ring, and engaging said locking-ring.

5. In a union or coupling, the combination with an attaching member, and a retaining-collar, of a locking-ring on said attaching member having, as a part of it, locking means adapted to engage with the corresponding locking means of the twin locking-ring of another coupling, and a screw-threaded ring mounted on said attaching member, retained thereon by said retaining-ring, and engaging said locking-ring; said retaining-collar adapted to abut against the corresponding collar of a similar attached coupling, and having a packing-ring.

GEORGE S. LEE.

Witnesses:
A. J. SANGSTER,
J. B. CONGER.